United States Patent [19]

Wasson et al.

[11] Patent Number: 5,765,591

[45] Date of Patent: Jun. 16, 1998

[54] VALVE APPARATUS AND METHOD FOR DISTRIBUTING FLUIDS

[75] Inventors: Jim Wasson, Los Altos; Steve Miller, Palo Alto; Peter Wright, Livermore; Daniel M. Bernstein, Redwood City, all of Calif.

[73] Assignee: Argonaut Technologies, Inc., San Carlos, Calif.

[21] Appl. No.: 560,728

[22] Filed: Nov. 20, 1995

[51] Int. Cl.$^6$ .................................. F16K 11/18
[52] U.S. Cl. ........................... 137/597; 137/606
[58] Field of Search ......................... 137/597, 606

[56] References Cited

U.S. PATENT DOCUMENTS

| | | | |
|---|---|---|---|
| 2,594,621 | 4/1952 | Derrick | 128/278 |
| 3,019,815 | 2/1962 | Lenardon et al. | 137/612.1 |
| 3,613,729 | 10/1971 | Dora | 137/624.18 |
| 3,951,167 | 4/1976 | Howell et al. | 137/608 |
| 4,008,736 | 2/1977 | Wittmann-Liebold et al. | 137/606 |
| 4,168,724 | 9/1979 | Graffunder et al. | 137/606 |
| 4,304,257 | 12/1981 | Webster | 137/559 |
| 4,558,845 | 12/1985 | Hunkapiller | 137/606 X |
| 4,597,412 | 7/1986 | Stark | 137/606 |
| 4,753,265 | 6/1988 | Barrett et al. | 137/554 |
| 5,172,728 | 12/1992 | Tsukazaki | 137/606 X |

Primary Examiner—Stephen M. Hepperle
Attorney, Agent, or Firm—Townsend and Townsend and Crew LLP

[57] ABSTRACT

A valve apparatus (2) for selectively distributing the sequential passage of separate, organic fluids to a common receiver, such as a reaction vessel. The valve apparatus comprises a valve body member (16) having multiple openings (56) and a plurality of separate conduits (54) each communicating a fluid source with one of the openings. The body member also has a common passage (60) with circular groove portions (62) surrounding the openings so that fluid flows radially outward from the openings toward the common passage. A plurality of pistons (30) are individually reciprocable between first and second positions for controlling fluid flow between associated openings and the common passage. The invention also provides a system (100) and method for measuring and delivering a precise quantity of each of the organic fluids, e.g., chemical reagents, to the reaction vessel.

21 Claims, 8 Drawing Sheets

5,765,591

VALVE APPARATUS AND METHOD FOR DISTRIBUTING FLUIDS

BACKGROUND OF THE INVENTION

The present invention relates generally to valves and more particularly to a valve apparatus and method for controlling the sequential passage of separate fluids to independent passage(s) or a common receiver, such as a reaction vessel.

The design of valves and flow systems for controlling and distributing reactive fluids involves specialized considerations. Organic reactions, for example, typically require the provision of precise amounts of chemical reagents in a rapid, sequential manner. To be effective in these applications, the fluid passages defined by the valves and flow systems should be designed so that they can be easily cleaned to minimize reagent deterioration and contamination. In addition, portions of such fluid flow systems must be capable of reliable isolation so as to prevent unwanted or untimely mixing of different organic fluids.

Existing valves for controlling and distributing fluids generally comprise a chemically inert valve body having a common passage in communication with a common receiver, such as a reaction vessel, and connectable to a series of separate conduits in communication with different fluid sources. The fluid path between the common passage and each of the separate conduits are typically controlled by a number of solenoid actuated plungers. The plungers are reciprocated into and out of sealing relationship with the valve body to fluidly isolate and fluidly couple the separate conduits with the common passage.

In one such valve, which is described in U.S. Pat. No. 4,597,412 to Stark, the fluid conduits within the valve body lead to longitudinally spaced openings in the upper surface of the valve body. The common passage is a straight, longitudinal groove formed in the upper surface of the valve body and offset from the openings in the upper surface. A flexible membrane or diaphragm overlies intervening lands defined between the openings and the groove. To close the valve or prevent fluid flow across the intervening lands, the solenoid actuated plungers are biased against the flexible membrane to press it down into sealing relationship with the lands, thereby isolating the respective opening from the longitudinal groove. To open the valve, the pistons are retracted away from the lands so that fluid pressure within the conduits in the valve body (or vacuum pressure applied to the upper surface of the diaphragm) locally lifts the diaphragm, thereby allowing fluid flow from the opening across the land to the common passage.

Existing valves for distributing fluids in biomedical and organic reactions, however, suffer from a number of drawbacks. For example, small droplets of the fluids flowing underneath the flexible membrane may adhere to the membrane causing potential cross-contamination with other fluids in the sequential operation. In particular, the repeated pressure of the pistons against local areas of the flexible membrane eventually causes the membrane to stretch, forming an upwardly deflected area or dead space around the circumference of the pistons. Fluids tend to collect in this dead space and can be difficult to remove during cleaning, which can lead to deterioration of the membrane and/or cross-contamination between different fluids.

Another drawback with existing valve systems is that these systems typically rely on fluid or vacuum pressure to locally lift the flexible membrane, thereby allowing the fluid to flow between the lifted portion of the membrane and the intervening land on the surface of the valve body. To establish a suitable flow rate, the flexible membrane must be relatively thin, on the order of less than 0.13 mm, so that the applied pressure will be sufficient to lift the membrane and establish a fluid path to the common passage. Membranes of this size, however, are not sufficiently durable for organic reactions because they tend to crack or stretch after repeated flexings. In addition, the organic fluids may leach through a relatively thin membrane, thereby contaminating the opposite side of the membrane.

Another challenge presented by sequential operations is that it is often desirable to deliver precise volumes of each fluid from the different fluid sources to the reaction vessel. To accomplish this, sensors are typically positioned along the fluid path between the outlet of the valve body and the reaction vessel. The sensors are operatively coupled to the solenoids and configured to close the valve (i.e., move the pistons towards the valve body) when the fluid reaches a particular point along the fluid path that generally corresponds to the desired volume of fluid.

Unfortunately, existing valve systems for measuring discrete volumes of fluid are not sufficiently accurate for such fluid handling systems. For example, one of the difficulties with the system described above is that the separate fluid sources communicate with the upper surface of the valve body at longitudinally spaced outlets. Thus, when fluid from a particular fluid source is delivered through the common passage to the fluid path, the volume of fluid in the common passage will vary depending on from which source the fluid has originated. Accordingly, the sensor will provide varying and inaccurate readings, which may be undesirable in sensitive organic reactions.

For these and other reasons, it would desirable to provide improved valve apparatus and methods for selectively distributing and metering fluids, such as chemical reagents, from a plurality of fluid sources to independent passage(s) or a receiving vessel.

SUMMARY OF THE INVENTION

The present invention provides improved methods and apparatus for controlling and distributing fluids, such as chemical reagents. To accomplish this, the invention provides a valve apparatus configured to selectively distribute and control the sequential passage of separate fluids to an independent passage(s) or common receiver, such as a reaction vessel. In addition, the invention provides a system and method for measuring and delivering a precise quantity of each of the fluids to the reaction vessel.

The valve apparatus comprises a valve body member defining a surface with multiple openings and a plurality of separate conduits each communicating one of the fluid sources with one of the openings in the surface. The body member also defines a common passage having a plurality of groove portions defining intervening lands between the groove portions and the openings for delivery of fluid from the openings to the common passage. The groove portions at least partially surround the openings in the body member surface so that the fluid flows radially outward from the openings toward the groove portions. The valve apparatus further includes a plurality of pistons which are individually reciprocable between first and second positions for controlling fluid flow between associated openings and the common passage.

The valve apparatus may further include a flexible sheet member disposed between the surface of the body member and the pistons. The flexible sheet member should be sufficiently flexible to deflect locally due to underlying fluid pressure from the openings so that, when the pistons are retracted from the sheet member, fluid can flow across the intervening lands to the common passage. One of the advantages of the present invention is that the groove portions partially surround the openings in the body member surface so that fluid flows radially outward between the openings and the common passage. This radial flow increases the flow rate relative to linear or one dimensional flow, thereby reducing the distance which the flexible sheet member must be moved upward from the sealing surface to allow a given flow rate across the sealing surface. Therefore, a thicker, more durable sheet member can be used, which increases the reliability and the lifetime of the diaphragm. In addition, the thicker sheet member minimizes leaching of organic fluids through the member, where the organic fluids could damage or destroy overlying portions of the valve.

The pistons may have sealing surfaces at their tips for engaging the flexible membrane. Preferably, the groove portions of the common passage will be sized to extend around at least a portion of the perimetrical edge of the piston sealing surfaces. With this configuration, the portion of the flexible membrane that tends to stretch and deflect upwards around the circumference of the pistons will overly the groove portions. Therefore, the fluid that collects in this space can be periodically washed by delivering a cleaning fluid through the common passage, thereby eliminating the dead space created by existing valve systems.

In another aspect of the invention, a system and method for measuring and delivering a precise quantity of fluid from the fluid sources to the receiving vessel is provided. The system comprises an elongate valve body defining a surface with multiple openings spaced at intervals and a plurality of separate conduits each communicating one of the fluid sources with one of the openings in the surface. The valve body has outlets on opposing ends and a common passage formed between the outlets. The system further includes first and second measuring passages in communication with the first and second outlets, respectively, and a sensor(s) operatively coupled to the first and second measuring passages for detecting when the volume of fluid within the common passage and the first and second measuring passages is substantially equivalent to the desired quantity of fluid.

One of the advantages of the invention is that the common passage and the measuring passages are configured to allow fluid flow in both directions so that fluid introduced into the common passage from one of the fluid sources will flow into both of the measuring passages. When the fluid reaches a threshold point in one of the measuring passages, the system signals one of the solenoids to shut off fluid flow through the associated outlet in the valve body. The system allows the fluid to continue to flow into the other measuring passage until the second outlet sensor threshold point has been reached, where the flow through the second outlet is shut off. This allows the operator to measure a precise volume of fluid regardless of the source from which the fluid has originated.

Other features and advantages of the invention will appear from the following description in which the preferred embodiment has been set forth in detail in conjunction with the accompanying drawings.

DESCRIPTION OF THE SPECIFIC EMBODIMENTS

Figure 1:
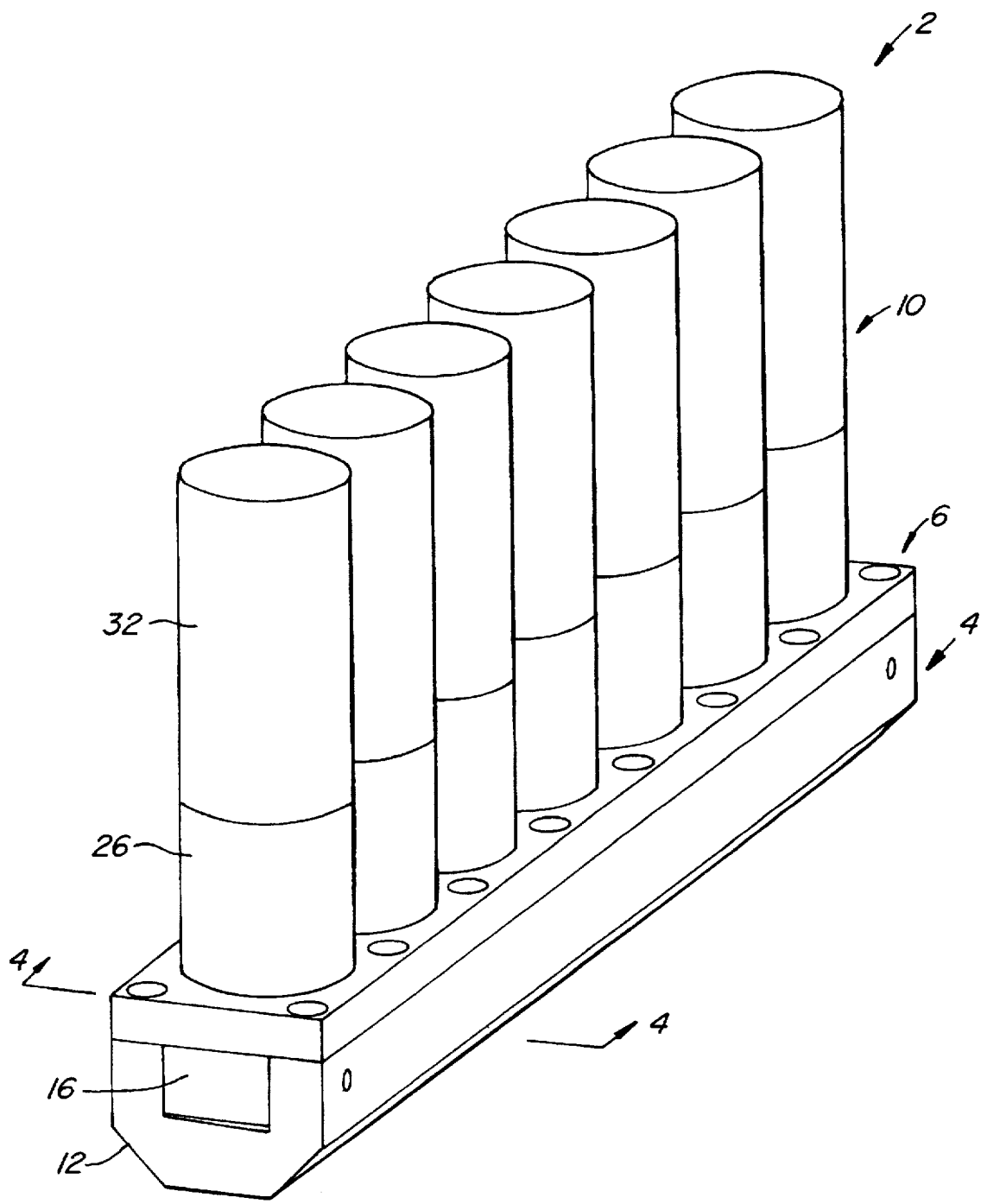
FIG. 1 is a perspective view of a valve apparatus according to the present invention.

Referring to the drawings in detail, wherein like numerals indicate like elements, a valve apparatus 2 is illustrated according to the principles of the present invention. Valve apparatus 2 generally includes a valve base 4, a valve cover 6 fluidly tightly covering a valve diaphragm 8 over the valve base 4 and a plurality of solenoid operated valve actuators 10 inserted through cover 6 for cooperating with diaphragm 8 to control the passage of organic fluids, such as chemical reagents, through the valve base.

Figure 2:
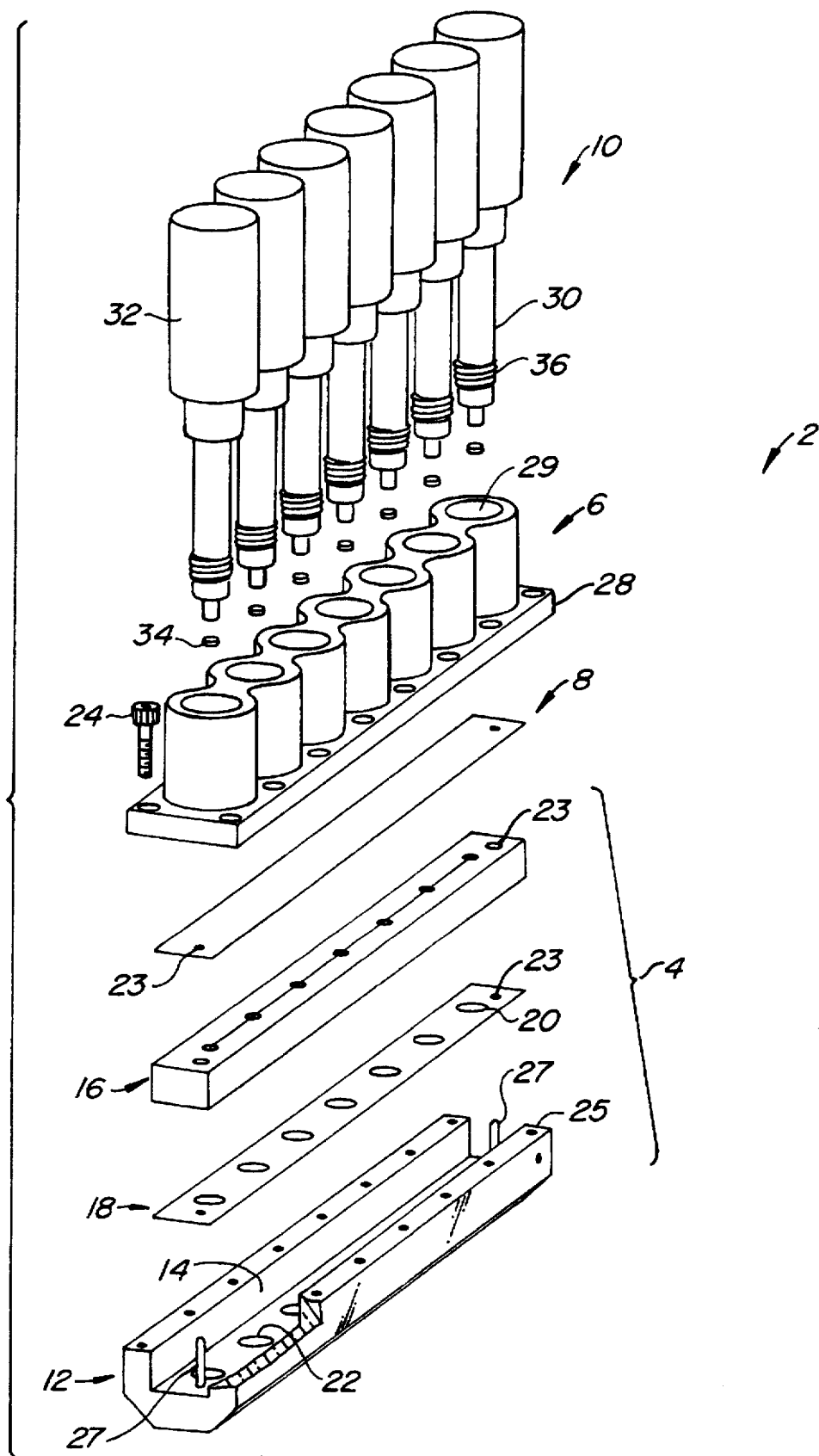
FIG. 2 is an exploded view of the valve apparatus of FIG. 1.
Figure 3:
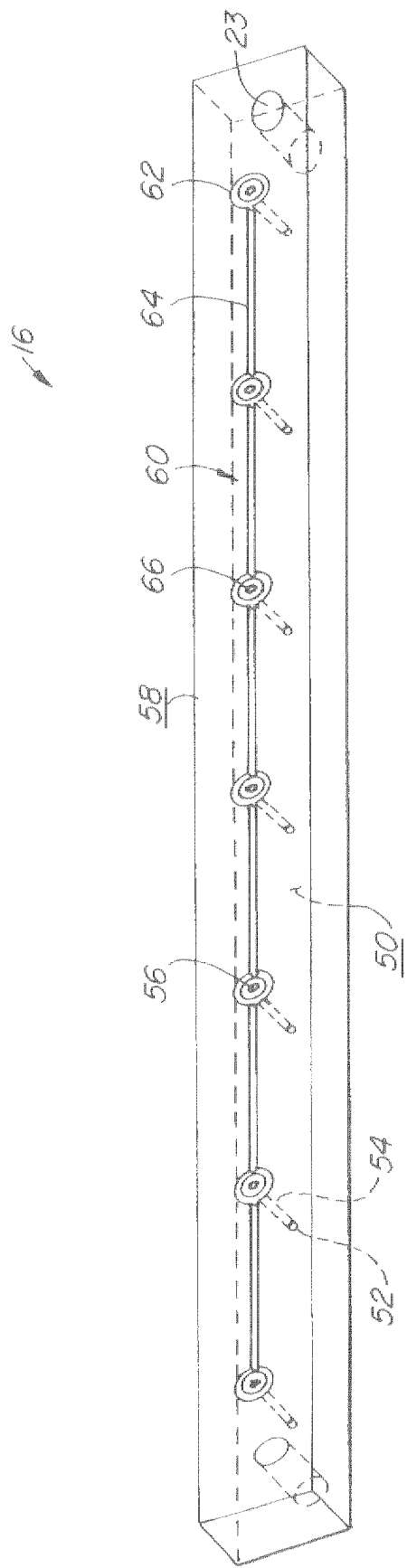
FIG. 3 is a perspective view of a valve body of the valve apparatus of FIG. 1, illustrating a valve body.

Referring to FIGS. 1–3, valve base 4 comprises an elongated block 12 fabricated of a rigid machinable and moldable material, such as aluminum, stainless steel, plastic or the like. Block 12 defines a longitudinal recess 14 therein for supporting a valve body 16. The depth of recess 14 is preferably less than the height of valve body 16 so that valve body 16 and diaphragm 8 are compressed when assembled (see FIGS. 4 and 5) to allow sealing of the flow passages, as discussed in greater detail below. Base 4 further includes an elastomeric pad 18 defining a plurality of longitudinally spaced holes 20 that communicate with fluid passages 22 defined in base 4 for receiving fluid from different fluid sources (not shown). Pad 18 serves to protect valve body 16 from damage that may be caused by the compression pressure applied by cover 6 and base 4.

As shown in FIG. 2, valve cover 6 comprises a plurality of cylindrical tubes 26 attached to a rectangular base 28 which is fastened to valve base 4 with a perimetrically disposed series of fasteners 24, such as bolts, screws or the like, threaded into suitably aligned holes 25 in block 12. Block 12 preferably includes a pair of elongate pins 27 extending vertically from recess 14 through holes 23 in elastomeric pad 18, valve body 16 and diaphragm 8. Pins 27 function to maintain the alignment of the pad, valve body and diaphragm within cover 6 and block 12. Of course, it will be readily recognized by those skilled in the art that the various elements of valve assembly 2 can be coupled together in a variety of conventional manners.

Each of the solenoid actuated valve actuators 10 comprises a piston 30 slidably mounted within a cylinder 32 for reciprocation therein. The lower portion of pistons 30 are slidably disposed within cylindrical bores 29 of tubes 26. Actuators 10 preferably include impact pads 34 disposed between the lower ends of pistons 30 and diaphragm 8 for protecting diaphragm 8 from the reciprocating pistons. Impact pads 34 also serve to uniformly distribute the pressure from pistons 30 over diaphragm 8. Impact pads 34 preferably comprise an elastomeric or plastic, inert material, such as KEL-F, HDPE, PTFE, EPR, KAL-REZ, CHEM RAZ, polyethylene or the like. Pistons 30 are each individually reciprocable between a closed position (FIG. 4), where the lower end of the piston is pressed against the respective impact pad 34 to maintain a seal against the underlying valve body 16 and an open position (FIG. 5), where the lower end of the piston 30 retracts from impact pad 34 to allow the impact pad 34 and diaphragm 8 to deflect upwards in response to fluid pressure, as discussed below. Solenoids 10 preferably comprise a compression spring 36 for biasing pistons 30 into the closed position. Solenoids 10 can be actuated to reciprocate pistons 30 by a variety of conventional mechanisms, such as electromagnetic systems, pneumatic systems, linear drive, stepper motors or the like.

As shown in FIG. 3, valve body 16 is generally rectangular in longitudinal and transverse cross-section and fabricated of an inert material which is machinable and dimensionally stable under reaction conditions. In the preferred embodiment, valve body 16 comprises a silica material, such as glass or ceramics, because these materials generally do not absorb chemicals from passing fluids. As will be discussed further below, the novel geometry of the fluid passages within body 16 facilitates the fabrication of a glass valve body because these passages are either surface machined or drilled substantially straight through the body. Of course, it will be recognized that other suitable materials may be used for valve body, such as synthetic organic plastics, e.g., Kel-F, a polytrifluorocholoroethylene, metals, such as stainless steel or aluminum, or the like. Glass, however, is preferred because it is more chemically inert to reactants that are typically used for organic chemical synthesis. In addition, glass is less sensitive to abrasives than other materials, such as polymers, and, therefore, can be readily cleaned with, for example, a wire brush.

As shown in FIG. 3, valve body 16 has a normally lower, horizontal surface 50 defining a plurality of inlet ports 52 communicating with a plurality of fluid passages 54 extending through valve body 16. Inlet ports 52 can be coupled to a series of separate fluid sources 202 (see FIG. 11) for selectively distributing separate fluids through valve body 16. Fluid passages 54 each lead to an opening 56 in an upper, sealing surface 58 of valve body 16. Fluid passages 54 are substantially straight so that they can be readily drilled through a valve body made of glass. Passages 54 preferably have a circular cross-section with a diameter of 0.6 to 4.0 mm to facilitate sealing of openings 56.

Valve body 16 further comprises a longitudinal common passage 60 formed in upper surface 58 of the body. Common passage 60 includes a plurality of annular groove portions 62 surrounding each of the openings 56 and a plurality of linear groove portions 64 that fluidly couple the annular groove portions 62 to each other. Each annular groove portion 62 defines an intervening land 66 between the groove portion 62 and respective opening 56 for delivery of fluid from openings 56 to common passage 60. The surface geometry of common passage 60 allows it to be formed by ultrasonically machining grooves 62, 64 in the surface of the glass valve body 16.

Referring again to FIG. 2, diaphragm 8 is a flexible, elastic membrane sized to cover upper sealing surface 58 of valve body 16. Alternatively, diaphragm 8 may be sized to only cover common passage 60 (i.e., annular and linear groove portions 62, 64) and the intervening lands 66 between the common passage and openings 56. Diaphragm 8 comprises a material sufficiently flexible to be locally deflectable responsive to fluid pressure in fluid passages 54 and, otherwise nonresponsive along its length. Diaphragm 8 should also be chemically inert, dimensionally stable under operating conditions and strong enough to withstand repeated flexings. Suitable materials for diaphragm are Teflon, fluoroethylene elastomers, such as Kel-rez, other suitable synthetic organic polymeric materials and the like.

Figure 4:
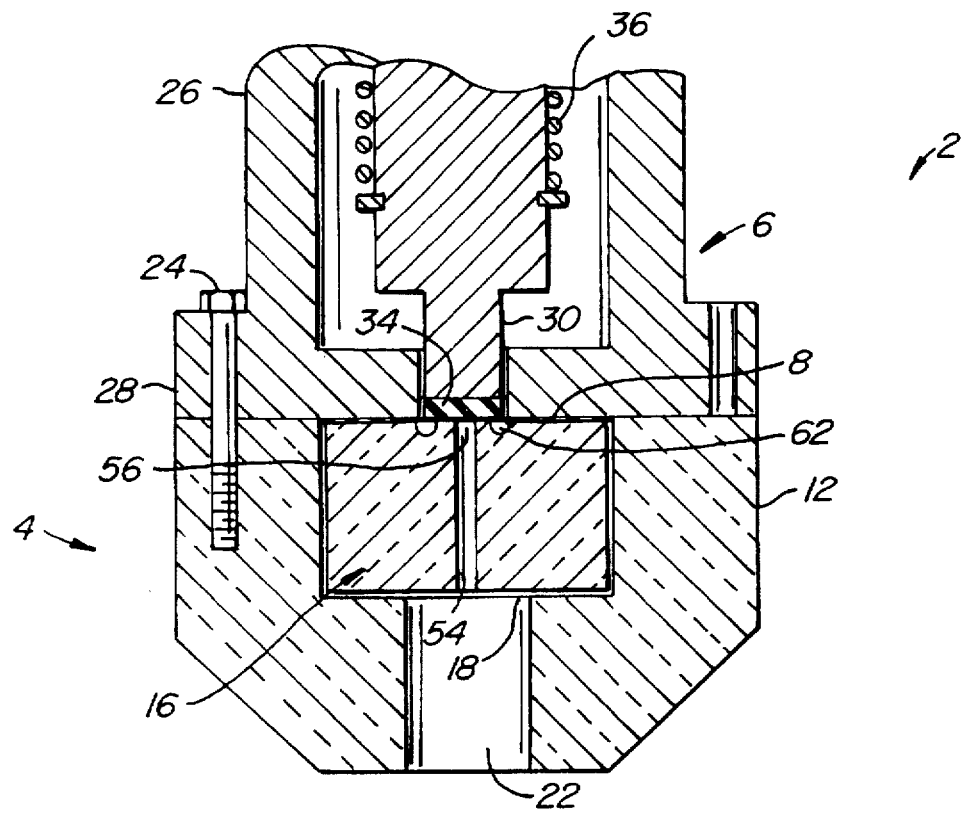
FIG. 4 is a vertical sectional view of the valve apparatus of FIG. 1 taken along lines 4—4, illustrating the valve in a closed configuration.
Figure 5:
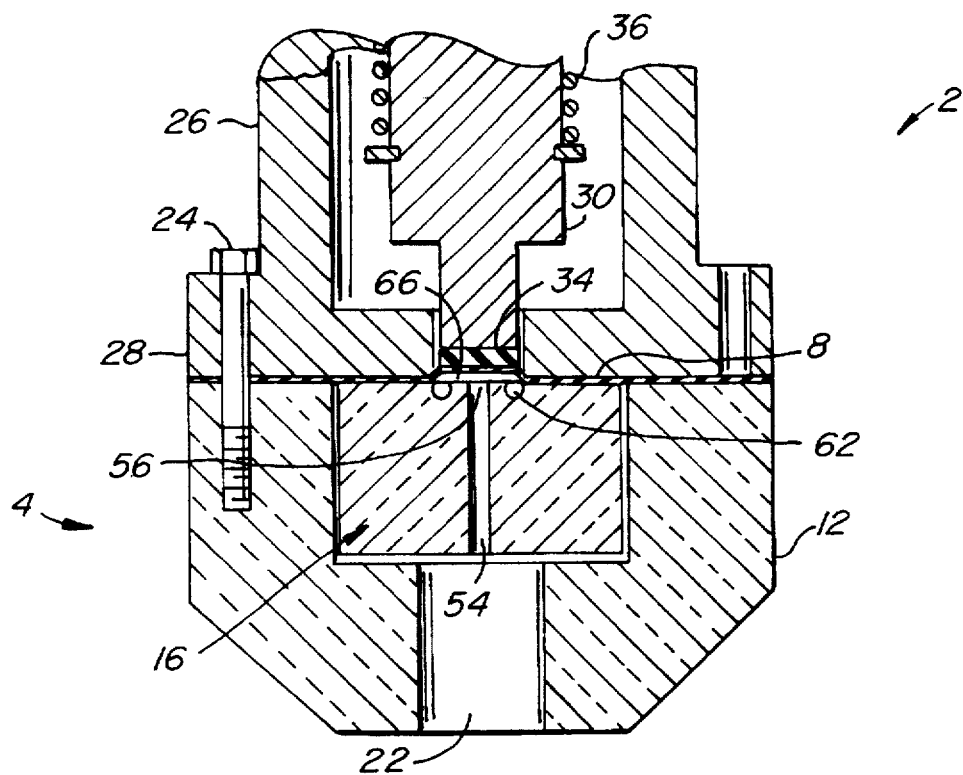
FIG. 5 is a vertical sectional view of the valve apparatus of FIG. 1 taken along lines 4—4, illustrating the valve in an open configuration.
Figure 7:
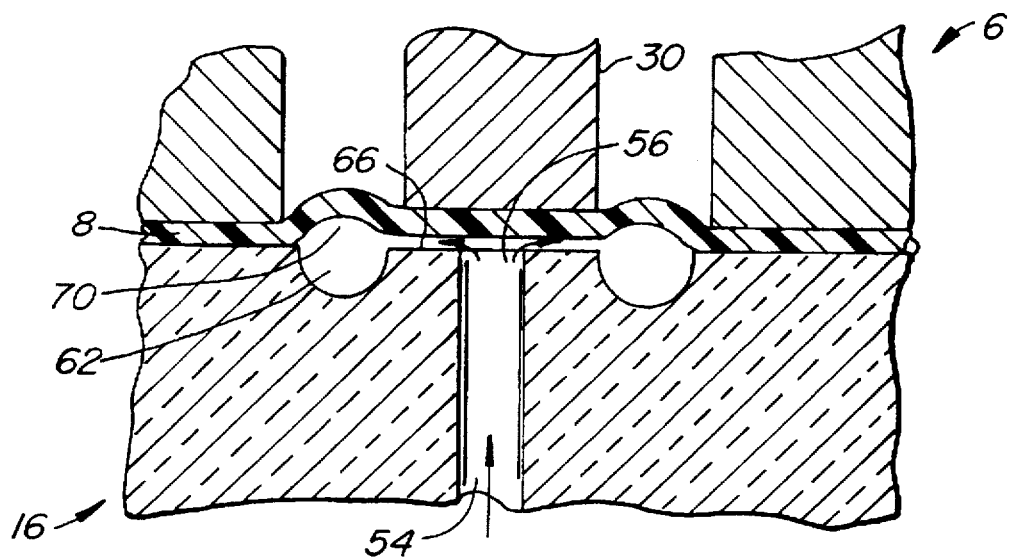
FIG. 7 is a vertical sectional view of the valve apparatus of FIG. 6 illustrating deformation of a flexible diaphragm.

As shown in FIGS. 4 and 5, annular groove portions 62 are sized and shaped to define intervening lands 66 having an outer diameter greater than the diameter of pistons 30. With this configuration, the annular channel 70 (shown in FIG. 7) formed by the upward deformation of diaphragm 8 around the circumference of pistons 30 will overlie circular groove portions 62. Therefore, channel 70 can be periodically washed by directing a cleaning fluid through common passage 60, which eliminates any dead space that may have been generated by the upward deformation of diaphragm 8. In addition, the size and shape of groove portions 62 minimizes the area of lands 66 and, therefore, decreases the area of sealing surfaces 34 on pistons 30. A smaller sealing surface area increases the pressure that solenoid operated valve actuators 10 can withstand in the sealed position. This is important in heated chambers because high pressures may be encountered when heating volatile solvents.

As shown in FIG. 3, annular groove portions 62 completely surround openings 56 so that fluid will flow radially outward from openings 56 to the corresponding groove portions 62. The fluid preferably flows 360° from openings 56 to groove portions 62, thereby increasing the flow rate relative to linear or one dimensional flow. This increased flow rate reduces the distance in which the diaphragm 8 must be moved upward from sealing surface 58 of valve body 16 to allow a given flow rate through valve body 16. Therefore, a thicker, more durable diaphragm 8 can be used, which increases the lifetime of diaphragm 8 and minimizes leeching of the organic fluids through the diaphragm 8. Diaphragm 8 preferably has a thickness greater than 0.13 mm and usually between 0.15 and 0.4 mm.

It should be noted that the present invention is not limited to the common passage 60 described above and illustrated in the figures. For example, annular groove portions 62 do not have to completely surround openings 56, nor do they have to be circular. Groove portions 62 could, for example, be C-shaped, square, triangular, rectangular or a variety of other conventional shapes as long as the groove portions at least partially surround openings 56 to allow for two dimensional flow across lands 66. The annular groove portions 62 shown in the figures, however, is preferred because this configuration positions a portion of the common passage under the channel 70 formed by the deformation of diaphragm 8 around the circumference of pistons 30, thereby eliminating potential dead space, as discussed above.

In operation, two or more fluid passages 54 are connected to different fluid sources 202 to be used in a predetermined sequence. The solenoids 10 are then actuated according to this sequence to allow fluid delivery through common passage 60 into a reaction vessel or other common receiver connected to one of the fluid passages 54. Thus, for example, one of the solenoids 10 will be actuated to retract piston 30 against the resilient force of spring 36. As shown in FIG. 5, retraction of piston 30 from impact pad 34 allows fluid in passage 54, under pressure from the associated fluid source, to flow upwards through passage 54 and lift diaphragm 8 (and the impact pad 34 therewith) locally at the surface opening 56. The localized lifting of diaphragm 8 disengages the diaphragm 8 from the land 66 thereopposite and permits fluid flow in a radially outward direction into the annular groove portion 62 across the land 66. It may be desired to assist the lifting of diaphragm 8 with a suitable vacuum source over diaphragm 8 in, for example, low pressure fluid deliveries or flow rate dependent deliveries.

Although diaphragm 8 has been locally deflected at one of the lands 66, it remains in sealing contact with the remaining lands 66 so that only fluid from one fluid source enters common passage 60. A second solenoid 10 is actuated (preferably simultaneously with the first solenoid) to retract a second piston 30 opposite the fluid passage 54 leading to the common receiver. Retraction of the second piston 30 allows the fluid to flow through common passage 60 via interconnecting groove portions 64 and other annular groove portions 62 and across the corresponding land 66 to the surface opening 56 communicating with the second fluid passage 54 (FIG. 3). Once a suitable volume of fluid has been delivered from the second fluid passage to the common receiver, both pistons 30 are allowed to move diaphragm 8 into sealing engagement with lands 66 to close the respectively openings 56 (see FIG. 4). Common passage 60 may then be washed with a suitable cleaning fluid, such as DMF, DCM, THF or the like, to remove the remaining fluid that may have adhered to the surfaces of common passage 60 when the openings 56 were sealed. The cleaning fluid will also suitably wash the annular channel 70 (FIG. 7) formed around pistons 30 as it flows through groove portions 62 of passage 60.

Figure 6:
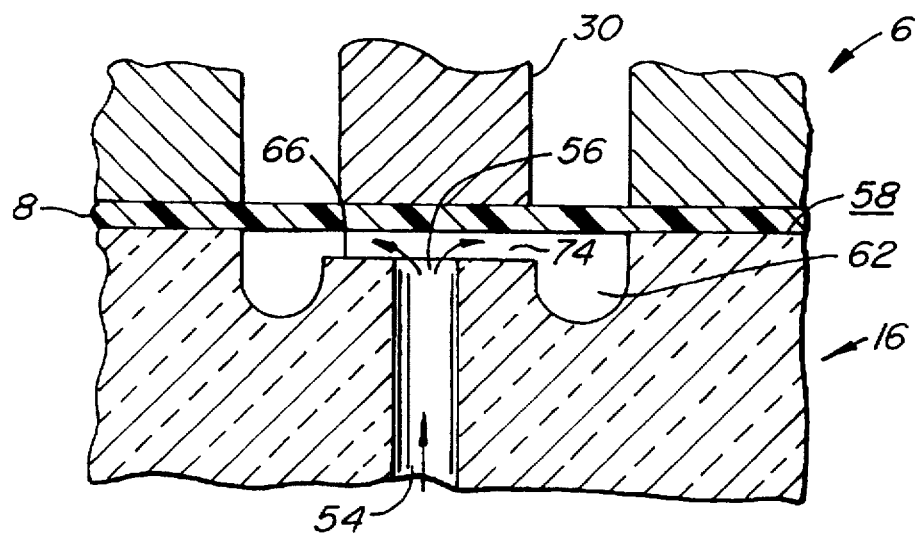
FIG. 6 is a vertical sectional view of an alternative embodiment of the valve apparatus of FIG. 1.

FIG. 6 illustrates an alternative embodiment of valve body 16. In this embodiment, intervening lands 66 are recessed from upper sealing surface 58, usually about 0.05 to 0.1 mm. Thus, diaphragm 8 must be pressed downward by piston 30 in order to seal land 66. When piston 30 is retracted, the elastic resiliency of the diaphragm 8 urges it upwards into the planar configuration shown in FIG. 6 to form a fluid path 74 across land 66. This fluid path 74 increases the flow rate through valve body 16 and allows use of a thicker, more durable diaphragm 8 because diaphragm 8 will naturally form a fluid path 74 (i.e., it is not necessary to generate a high fluid pressure within passage 54 to locally lift diaphragm 8).

Figure 8:
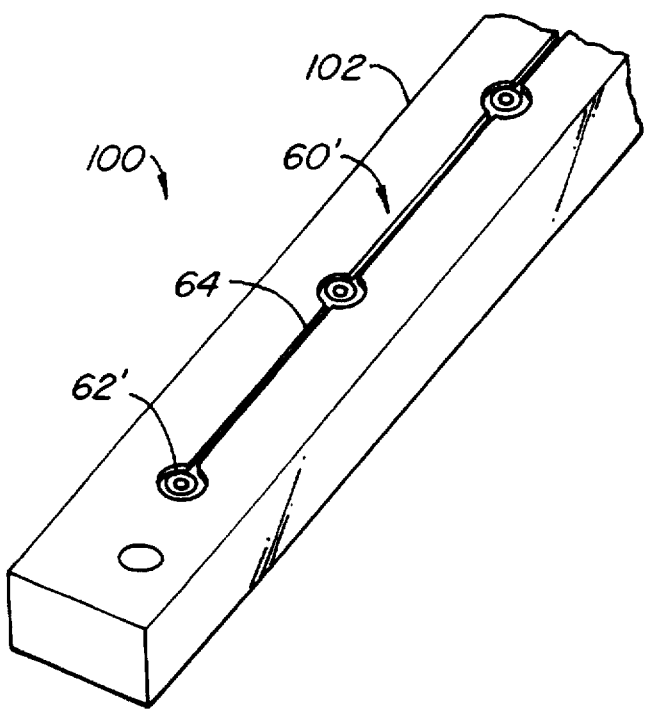
FIG. 8 is a partial perspective view of an alternative valve body according to the present invention.
Figure 9:
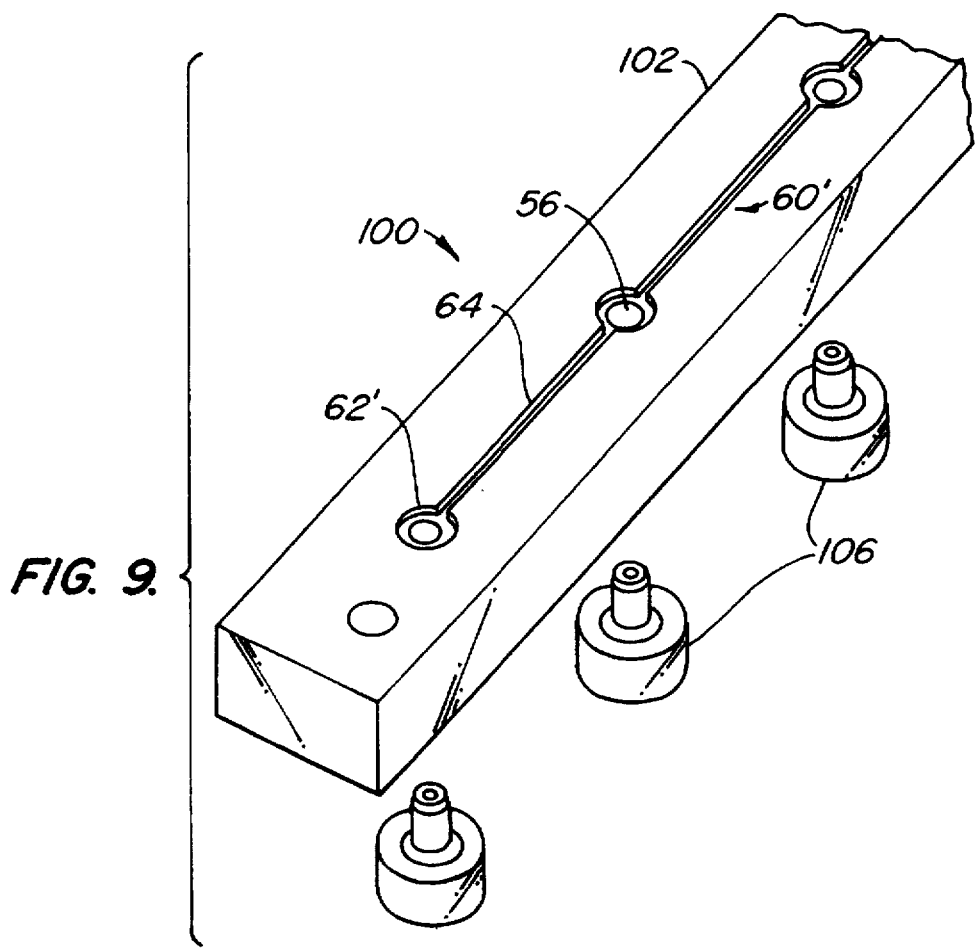
FIG. 9 is an exploded view of the valve body of FIG. 8.
Figure 10:
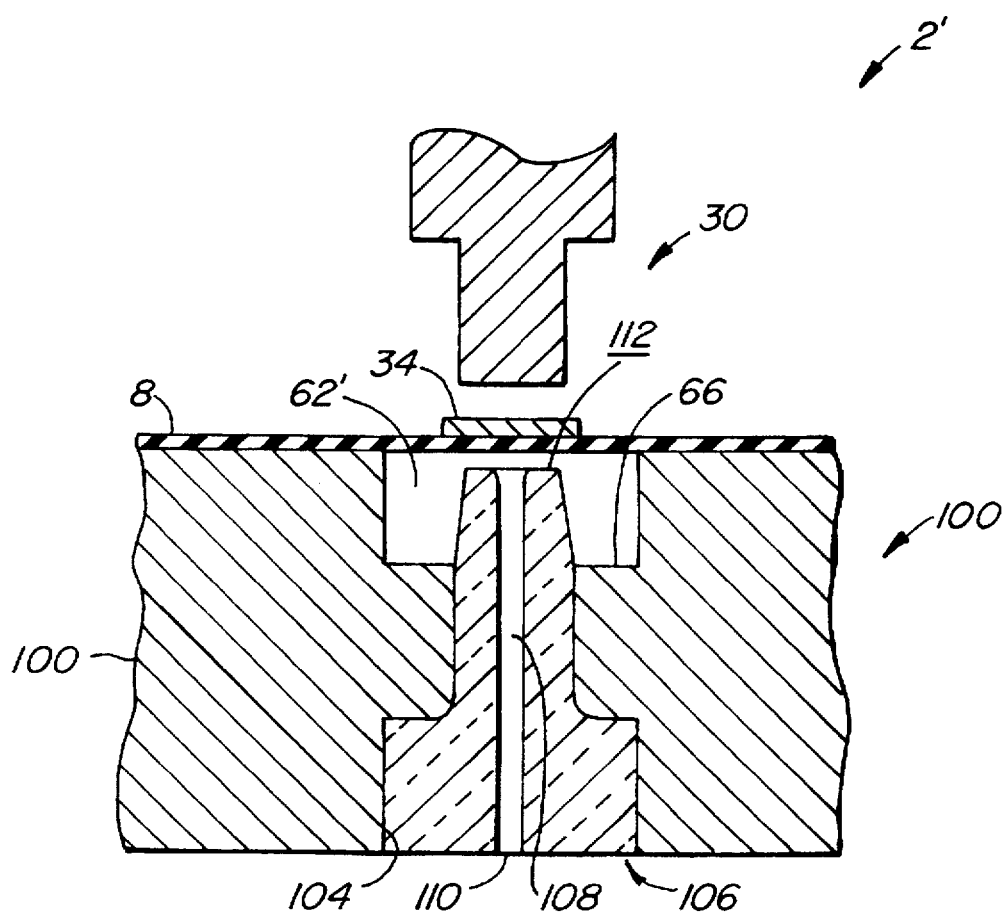
FIG. 10 is a vertical sectional view of the valve body of FIG. 8, illustrating the valve in an open configuration.

FIGS. 8–10 illustrate an alternative valve body 100 comprising a valve block 102 preferably constructed of a readily moldable and relatively inexpensive material, such as Teflon. Similar to the above valve, block 102 defines a common passage 60' comprising a plurality of circular groove portions 62' and interconnecting linear groove portions 64 and a plurality of openings 56 in communication with circular groove portions 62' of common passage 60' (FIG. 9). Block 102 further includes cavities 104 in communication with openings 56 for receiving valve seats 106. As shown in FIG. 10, valve seats 106 each define an inner passage 108 having an inlet 110 for coupling to a fluid source 202. Inner passages 108 communicate inlets 110 with the circular groove portions 62' for allowing passage of fluid from fluid sources 202 to common passage 60'.

Valve seats 106 are preferably constructed of a chemically inert material, such as glass or ceramics, because, as discussed above, these materials generally do not absorb chemicals from passing fluids. In addition, glass does not exhibit the cold flow properties typically found with Teflon or other elastomeric materials. As shown in FIG. 10, the inert valve seats 106 have upper surfaces 112 disposed on the other side of diaphragm 8 from each of the pistons 30. Upper surfaces 112 are preferably recessed from the upper surface of valve block 102 so that diaphragm 8 naturally deflects upward into the open configuration of FIG. 10 when piston 30 is retracted from impact pad 34.

Figure 11:
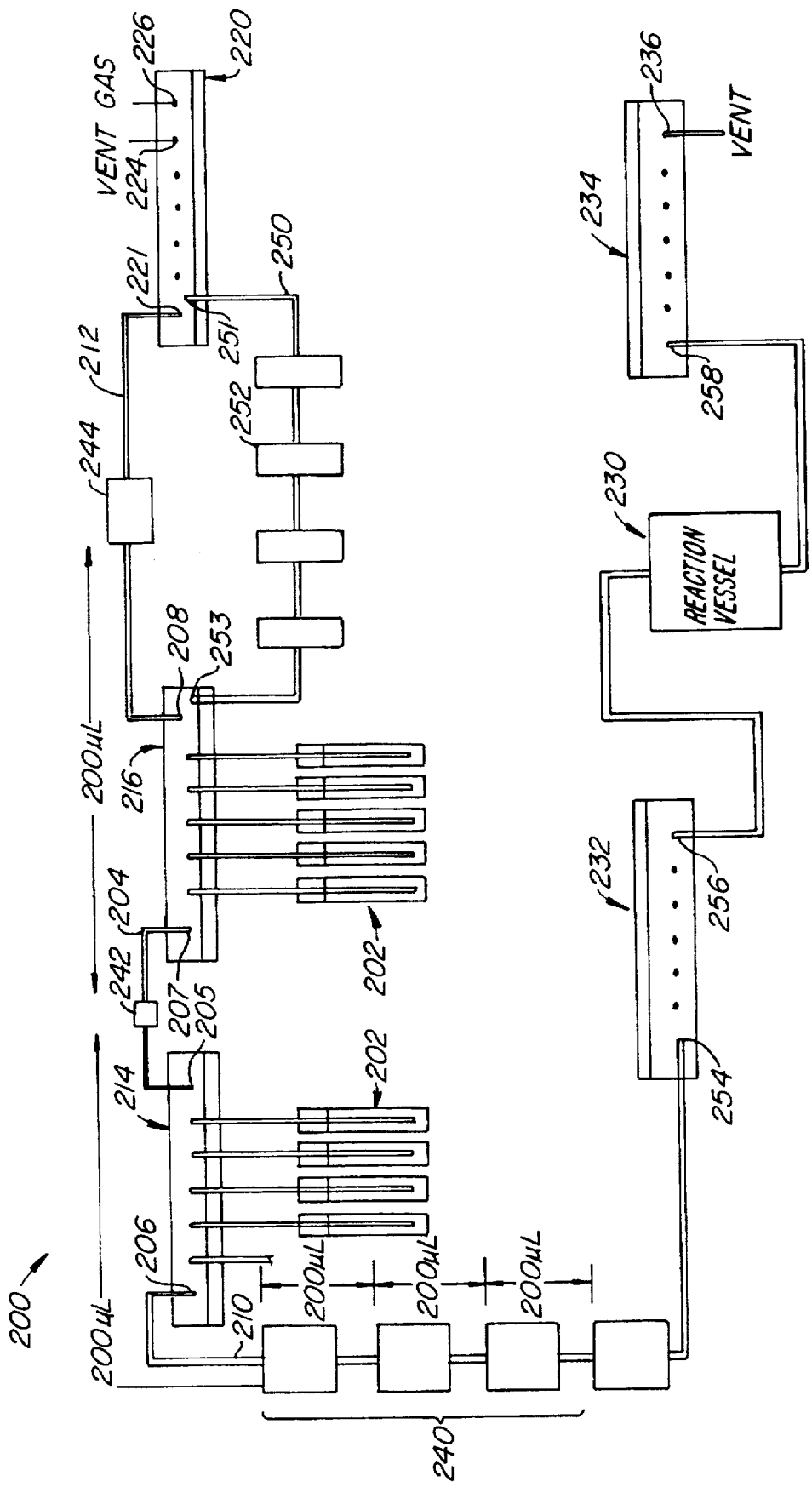
FIG. 11 is a schematic view of a system for distributing fluids according to the present invention.

FIG. 11 schematically illustrates a system 200 for measuring and delivering a precise quantity of biological fluid from a plurality of different fluid sources 202 to a common reaction vessel (230). System 200 comprises first and second valve blocks 214, 216 coupled together by a fluid conduit 204 that communicates with inner ports 205, 207 on opposing ends of valve blocks 214, 216, respectively. Each valve block 214, 216 can be fluidly coupled to a number of fluid sources 202 in the manner described above. For illustration purposes, note that common passages 60 are represented schematically as single linear passages spaced from openings 56 by intervening lands 66. It should be noted that the invention is not limited to two valve blocks connected together in series and may include only a single valve block or a plurality of valve blocks connected in parallel or series.

Each individual fluid source 202 can be communicated with a common passage 60 in one of the valve blocks by actuating one of the solenoids 10 (FIG. 2) and allowing fluid to flow across lands 66 in the manner described above. Valve blocks 214, 216 further include outer ports 206, 208 on opposite ends from inner ports 205, 207 for discharging fluid flowing through common passage 60 from the valves 214, 216. Preferably, ports 205–208 communicate with passage 60 across lands 66 in a similar manner as openings 56.

As shown in FIG. 11, system 200 further comprises first and second measuring passages 210, 212 in communication with ports 206, 208 of first and second valves 214, 216, respectively. A gas valve block 220 includes an inlet port 221 suitably connected to valve block 216 via second measuring passage 212. Gas valve 220 includes a vent 224 for allowing fluid flow from valves 214, 216 towards gas valve 220. Gas valve 220 also comprises a gas inlet 226, which is coupled to a source of pressurized gas for urging fluid flow in the opposite direction from valves 214, 216 through measuring passage 210 via gas pressure. Valves 214, 216 are preferably connected to a common reaction vessel 230 via measuring passage 210 and an intervening valve block 232. Valve block 232 includes an inlet 254 and an outlet 256, which are opened and closed via solenoids. It should be noted that valves 214, 216 may be connected to an independent passage or a plurality of separate passages or vessels, if desired. Reaction vessel 230 is suitably coupled to another valve block 234 having an inlet 258 and a vent 236 for allowing fluid flow from valve blocks 214, 216 towards the reaction vessel 230.

Measuring passages 210, 212 and fluid conduit 204 each comprise at least one sensor 240, 242, 244 positioned a suitable distance along each passage. Sensors 240, 242, 244 are configured to detect when the fluid has reached a particular point along measuring passages 210, 212 and fluid conduit 204. Sensors 240, 242, 244 are liquid sensing devices, such as a refractive index or an ultrasonic device, for detecting whether there is liquid or air in the fluid passages. Sensors 240, 242, 244 are each operatively coupled to the solenoids 10 via an controller (not shown) to shut off fluid flow when the fluid has reached the associated sensor 240, 242, 244. Preferably, the controller will close one of the vents 224, 236 to shut off fluid flow in the direction towards the respective vent depending on which sensor 240–244 has detected fluid.

As shown in FIG. 11, sensors 240, 242, 244 can be suitable positioned along the passages to measure a discrete volume of fluid therebetween. Preferably, these sensors will be positioned such that 200 uL of fluid will be contained within the passages between sensor 240 and sensor 244 (i.e., common passage 60 of valve 214, measuring passage 210 and fluid conduit 204) and another 200 uL of fluid will be contained with the passages between sensor 242 and sensor 244 (i.e., common passage 60 of valve 216, measuring passage 212 and fluid conduit 204). In this manner, each valve 214, 216 can meter a minimum volume of 200 uL into reaction vessel 230. In a specific configuration, system 200 further comprises a plurality of liquid sensors 240 positioned at spaced intervals along measuring passage 210 for metering separate volumes of fluid therethrough. Preferably, these liquid sensors 240 will each be positioned such that 200 uL of liquid will be contained within measuring passage 210 between adjacent sensors 240. In addition, the system 200 may include a third measuring passage 250 having inlet/outlet ports 251, 253 for coupling valve block 216 to gas valve 220. The third measuring passage 250 preferably includes a plurality of sensors 252 positioned at spaced intervals, similar to first measuring passage 210. However, sensors 252 will be positioned at a further distance so that a large quantity of fluid can be metered from valves 214, 216. Preferably, sensors 252 will be positioned such that one mL of fluid is contained within passage 250 between adjacent sensors 252. Thus, the operator may measure out virtually any quantity of fluid (at 200 uL intervals) by utilizing a combination of sensors along the first and third measuring passages 210, 250.

In operation, the solenoids 10 controlling fluid from one of the fluid sources attached to valve 216 and ports 207, 208 of the corresponding valve 216 are actuated to communicate common passage 60 with the fluid source and ports 207, 208. Vents 224, 236 are opened and the respective solenoids 10 are actuated to open ports 205, 206, 221, 254, 256 and 258 so that fluid is delivered into common passage 60 and allowed to flow in both directions along common passages through ports 207, 208 of the valve 216. When the fluid reaches the first sensor 244, vent 224 is shut off to prevent further flow of the fluid through the second measuring passage 212. The fluid will then flow only in one direction until it reaches the second sensor 242 and then vent 236 will be closed to prevent further fluid flow from source 202. At this point, 200 uL of fluid will be contained within the passage between sensors 242 and 244. The volume of fluid will be substantially equivalent to 200 uL regardless of the fluid source from which the fluid has originated because the fluid fills the entire common passage 60 of valve block 216 before reaching both of the sensors 244, 242. It should be noted that the passages may be configured such that fluid only flows in one direction until the corresponding vent is shut off.

If the operator wishes to meter a larger volume of fluid, e.g., 1.6 mL of fluid, third measuring passage 250 is fluidly coupled to valve block 216 by opening ports 251, 253 and second measuring passage 212 remains fluidly isolated from valve 216 by closing ports 208 and/or 221. Fluid flows in both directions as described above and, when fluid reaches the second sensor 240 along first measuring passage 210 (corresponding to a volume of 600 uL), vent 236 is shut off. Fluid is then allowed to flow only through third measuring passage 250 until reaching the first sensor 252 along this passage (corresponding to 1 mL of fluid). At that point, vent 224 and valve 216 are shut off. Gas is delivered into gas port 226 and vent 236 is opened again so that the 1.6 mL of fluid is allowed to flow into reaction vessel 230.

Although the foregoing invention has been described in detail for purposes of clarity of understanding, it will be obvious that certain modifications may be practiced within the scope of the appended claims. For example, the present invention is not limited to a generally rectangular valve body having a series of longitudinally spaced openings and a generally longitudinal common passage 60, as described above. In fact, the valve body of the present invention can comprise a variety of shapes so long as the common passage communicates with the openings and is continuous. For example, valve body 16, can have a circular longitudinal cross-section with a circular common passage 60 extending around the perimeter of body 16. Valve body 16 can have a variety of other shapes as well, such as an S shape, spiral shape, etc. Alternatively, the valve body can be generally rectangular and common passage can form a matrix of intersecting lines, the intersecting portions forming the circular groove portion surrounding openings 56.

What is claimed is:

1. A valve manifold for selectively distributing fluids from a plurality of fluid sources to one or more receiving vessels comprising:

a body member defining a surface with multiple openings and a plurality of separate conduits each communicating one of the fluid sources with one of the openings in the surface;

the body member further defining a common passage comprising a plurality of groove portions formed in the body member surface and in fluid communication with each other, each groove portion defining an intervening land between said each groove portion and one of the openings for delivery of fluid from the openings to the common passage, the groove portions at least partially surrounding the openings in the body member surface such that the fluid flows radially outward from the openings toward the groove portions;

a plurality of pistons each having a sealing surface juxtaposed one of the openings in the body member surface, the pistons being movable between a first position, where the sealing surfaces fluidly isolate the openings from the groove portions of the common passage, and a second position, where the sealing surfaces are spaced further away from the intervening lands between the openings and the groove portions to allow fluid flow therebetween; and wherein the intervening lands each have a diameter greater than a diameter of the sealing surfaces of the pistons.

2. The valve manifold of claim 1 wherein the groove portions circumscribe the openings so that the fluid flows radially outward 360 degrees from the openings toward the groove portions.

3. The manifold of claim 1 further comprising an actuator for individually reciprocating each piston between the first and second positions.

4. The valve manifold of claim 1 further including a flexible sheet member disposed between the surface of the body member and the pistons.

5. The valve manifold of claim 4 wherein the flexible sheet member is deflected into mating and sealing engagement with one of the lands to sealingly block fluid flow between the associated opening and groove portion when the corresponding piston is moved into the first position.

6. The valve manifold of claim 4 wherein the flexible sheet member is allowed to flex into a position spaced away from one of the lands to allow flow between the associated groove portion and opening when the corresponding piston is moved into the second position.

7. The valve manifold of claim 1 wherein the intervening lands are recessed from the surface of the body member.

8. The valve manifold of claim 1 wherein the common passage is formed in the body member surface, the body member comprising an inert material.

9. The valve manifold of claim 8 wherein the body member substantially comprises glass.

10. The valve manifold of claim 1 wherein the body member defines a plurality of cavities in communication with respective groove portions of the common passage, the valve manifold further including a plurality of valve seats positioned within the cavities of the body member, the valve seats each defining an inner passage communicating the respective groove portion with one of the fluid sources.

11. The valve manifold of claim 10 wherein the body member comprises a plastic material and the valve seats comprise glass.

12. The valve manifold of claim 11 wherein the valve seats substantially comprises glass.

13. A valve manifold for selectively distributing fluids from a plurality of fluid sources to one or more receiving vessels comprising:

a body member defining a surface with multiple openings and a plurality of separate conduits each communicating one of the fluid sources with one of the openings in the surface, the body member defining a common passage, the common passage comprising a plurality of groove portions formed in the body member surface and in fluid communication with each other, each groove portion defining an intervening land between said each groove portion and one of the openings for delivery of fluid from the openings to the common passage; and a plurality of pistons each having a sealing surface juxtaposed one of the openings, the pistons being movable between a first position, where the sealing surfaces fluidly isolate the openings from the groove portions of the common passage, and a second position, where the sealing surfaces are spaced further away from the intervening lands between the openings and the groove portions to allow fluid flow therebetween, the sealing surfaces each defining a perimetrical edge, the groove portions being disposed radially outward from the perimetrical edge of the sealing surfaces.

14. The valve manifold of claim 13 wherein the sealing surface is substantially circular, the common passage dividing into first and second portions that extend around each circular sealing surface to circumscribe each opening.

15. The valve manifold of claim 14 wherein the intervening lands between the first and second portions and the openings each have an outer diameter substantially equal to a diameter of the sealing surface.

16. The manifold of claim 13 further comprising an actuator for individually reciprocating each piston between the first and second positions.

17. The valve manifold of claim 13 further including a flexible sheet member disposed between the surface of the body member and the pistons.

18. The valve manifold of claim 17 wherein the flexible sheet member is deflected into mating and sealing engagement with one of the lands to sealingly block fluid flow between the associated opening and groove portion when the corresponding piston is moved into the first position.

19. The valve manifold of claim 17 wherein the flexible sheet member is allowed to flex into a position spaced away from one of the lands to allow flow between the associated groove portion and opening when the corresponding piston is moved into the second position.

20. The valve manifold of claim 19 wherein the flexible sheet member elastically deforms away from the body member surface around the piston sealing surface to form an annular raised portion circumscribing the piston sealing surface, the groove portions of the common passage being aligned opposite said raised portion.

21. The valve manifold of claim 13 wherein the intervening lands are recessed from the surface of the body member.

* * * * *